UNITED STATES PATENT OFFICE.

NICOLAI WASILIEVITCH TURKIN, OF MOSCOW, RUSSIA.

MANUFACTURE OF PAINTS AND PRINTING-COLORS.

1,164,036.

Specification of Letters Patent.

Patented Dec. 14, 1915.

No Drawing.

Application filed January 10, 1914. Serial No. 811,419.

*To all whom it may concern:*

Be it known that I, NICOLAI WASILIEVITCH TURKIN, a subject of the Czar of Russia, residing at Moscow, Russia, have invented certain new and useful Improvements in the Manufacture of Paints and Printing-Colors, of which the following is a specification.

This invention relates to the manufacture of paints and printing colors from coloring matters produced by the process described in the specification of my co-pending patent application Serial No. 811,173, filed January 9th, 1914.

The process referred to above for the production of coloring matters or dye stuffs suitable for painting, printing, etc., consists broadly in dissolving any desired pigment in a carrier so as to produce colloidal solutions of the pigment therein. The carrier has for its main constituent alizarin oil, and this is incorporated by heating with one or several other substances, such for example as basic aluminium acetate, salts of alkaline earth metals, naphthalene, fats or oils, etc., so as to produce a composition insoluble in water.

According to the present invention the composition of matter for use as a paint is obtained by adding to a coloring matter obtained by the process described in the specification of my co-pending patent application Serial No. 811,173 a varnish to act as a vehicle or carrier for the same, the said varnish being produced by heating together resin and an animal fatty substance and dissolving the product obtained thereby in a suitable liquid solvent of an aromatic series, viz: toluol, oil of turpentine, or the distillation produts from naphtha, coal or resin and by the term "liquid solvent" as used herein and in the claims, I intend to cover only these substances.

When the paint is intended for use as an artist's color, the composition of the varnish is somewhat modified in that the solid resins used in varnishes for producing common paint for ordinary painting purposes are replaced by easily liquefied resins, such for example as balsams.

A further feature of this invention is the manufacture of colors for printing purposes, for which purpose the pigment is incorporated with alizarin oil, either or both basic aluminium acetate and or a salt of a metal of the alkaline earths or alkalis, and a mixture of an animal fatty substance and naphthalene, and in addition with large quantities of mixtures of resins and a small quantity of glucose if desired, the whole mass being heated until it is of a consistency to solidify on cooling; the product thus obtained is then boiled with a thick fluid resin mixture prepared by boiling animal fat and resin with a suitable solvent, such for example as alcohol.

Throughout this specification and claims the word naphthalene is used to denote both naphthalene and its derivatives, and the term "animal fatty substance" is used to denote either animal fats or oils.

In order to dilute the coloring matters prepared as described in the specification of my aforesaid patent application, to any degree required according to the use for which they are intended, there must be used as diluents varnishes of a special kind, namely those containing resin and fish-oil dissolved in naphthalene or in the products of resin, coal and naphtha distillation, such for example as oil of turpentine, toluol, benzol, and creosote.

By using such varnishes, it is possible to dissolve completely the coloring matters prepared in the above mentioned manner, so that a coloring matter or dye-stuff is again obtained, which, like the initial coloring matter contains pigment in solution, and whenever a thin layer of the pigment carrier is removed by solution, there is simultaneously removed a corresponding portion of the dissolved pigment.

The addition of such a varnish imparts to the pigment a slight capacity to diffuse between the adjoining color coatings. This power of diffusion can be increased to any desired extent by the application of essential oils, such as for example aniseed oil, lemon-oil and the like, so that the limit or separation line between the adjoining color layers or bodies is wiped out; conversely, the power of diffusion can be destroyed by providing the adjoining color layers or color bodies on the surface with a coating of alizarin (Turkey red) oil and ammonia.

In carrying this invention into practical effect the coloring matters are manufactured as described in the specification of my patent application hereinbefore referred to.

A suitable diluent or varnish for the coloring substance is obtained as follows:—2.5 kg. fish (train) oil, 9 kg. shellac or, as is preferred, 7.5 kg. powdered copal resin (Angola) and a small quantity, for instance 1 kg. turpentine oil are well mixed together and boiled, the mass being thereupon poured while still warm into about 30 kg. toluol or 10 kg. turpentine oil and thoroughly stirred, until a clear solution is produced. Into this varnish is introduced a suitable quantity of the coloring matter obtained in the manner hereinbefore referred to, until the desired degree of spreading and covering capacity is obtained.

For artists' colors the same coloring matter as is employed for ordinary paint can be used, but a slightly different varnish is necessary. This varnish differs from the varnish described for colors intended for ordinary painting only by the fact that the solid resins are partly replaced by easily liquefied resins in the shape of balsams, such as for example copaiva balsam, so that for 2.5 kg. fish (train) oil there are used 5 kg. copal resin and 2.5 kg. copaiva balsam. These three ingredients are again boiled together, whereupon the mass is again dissolved in a suitable quantity of toluol or some other product of distillation of naphtha, coal or resin.

The following is an example of the manufacture of a red color suitable for printing purposes. First of all there are prepared three mixtures consisting of:—1. 100 gms. basic aluminium acetate and 200 gms. alizarin (Turkey red) oil. 2. 10 gms. Biebrich scarlet and 100 gms. alizarin (Turkey red) oil. 3. 20 gms. naphthalene and 20 gms. fish (train) oil. These three mixtures are combined together, and a mixture of resins, consisting of 50 gms. Canada balsam, 250 gms. Venetian turpentine, 100 gms. copal resin, 50 gms. pine resin, 25 gms. elemi resin, 50 gms. shellac is added to it, with constant stirring and heating. Moreover, 25 gms. glucose, previously mixed if desired with powdered resins, are added to the mass. The mass is again boiled, until it becomes solid on cooling. With this coloring mass is combined a thick fluid resin- mixture previously prepared by mixing 125 gms. fish (train) oil, 650 gms. copal resin with 225 gms. spirits of wine (95%) or some other (preliminary) solvent, and boiling the mixture in question. In the event of the mass being too solid for treatment, some solvent, such as for instance toluol, can be added to it, until it acquires the desired consistency. In the same way any desired color pigment can be introduced into the same or a similar carrier substance.

Throughout this specification, alizarin oil is used to denote the neutralized products obtained by treating with sulfuric acid not only olive oil, but also other oils, such for example as castor oil, cotton seed oil and other oils containing glycerids of palmitic acid, oleic acid, etc.

In order to prepare plates for printing purposes, the colors are transferred to the plate, according to the desired pattern by means of a brush or the like, care being taken to avoid overlapping of the edges of the various color zones, and subsequently the plates are dried, if desired by heat. Another method consists in forming the printing block of small bars of the various coloring substances required to build up the pattern.

In printing from plates or blocks prepared as above described the surface of the same is moistened with a color solvent prepared as follows:—75 gms. spirits of wine (95%), 155 gms. spirits of lavender, 40 gms. alizarin (Turkey red) oil, 150 gms. methyl alcohol, 120 gms. toluol, 10 gms. xylol, 15 gms. paraffin in the form of a solution in xylol and of the consistency of milk, 190 gms. glacial acetic acid, 40 gms. petroleum ether, 25 gems. sulfuric ether, 50 gms. acetic ether, 40 gms. creosote, 75 gms. ammonia (25%), 15 gms. of an alcohol solution, of milk consistency, of equal quantities of copal resin and fish (train) oil, are all boiled together.

Instead of moistening the plates or blocks, the surface to be printed on can be moistened with the color solvent, whereby the printing surfaces are indirectly moistened.

The proportions of mixtures of the varnishes and of the coloring matters with which they are mixed are only given in the specification by way of example, and may be varied according to the nature of the product, it is desired to obtain.

What I claim as my invention and desire to secure by Letters Patent is:—

1. A composition of matter for use as a paint, comprising a coloring matter produced by forming a colloidal solution of a color pigment in a composition of matter having a base of alizarin oil and insoluble in water and a varnish containing resins, an animal fatty substance, and a hereinbefore described liquid solvent of the aromatic series.

2. A composition of matter for use as a paint, comprising a coloring matter produced by forming a colloidal solution of a color pigment in a composition of matter having a base of alizarin oil and insoluble in water and a varnish containing copal resin, fish-oil, and a hereinbefore described liquid solvent of the aromatic series.

3. A composition of matter for use as a paint, comprising a coloring matter produced by forming a colloidal solution of a color pigment in a composition of matter having a base of alizarin oil and insoluble in water and a varnish containing copal resin, fish-oil and toluol.

4. A composition of matter for use as a paint, comprising a coloring matter produced by forming a colloidal solution of a color pigment in a composition of matter having a base of alizarin oil and insoluble in water and a varnish containing resins, an animal fatty substance and toluol.

5. A composition of matter for use as a paint, comprising a coloring matter produced by forming a colloidal solution of a color pigment in a composition of matter having a base of alizarin oil and insoluble in water and a varnish produced by boiling together resins and an animal fatty substance, and a hereinbefore described liquid solvent of the aromatic series.

6. A composition of matter for use as a paint, comprising a coloring matter produced by forming a colloidal solution of a color pigment in a composition of matter having a base of alizarin oil and insoluble in water and a varnish comprising copal resin and fish-oil, and a hereinbefore described liquid solvent of the aromatic series.

7. A composition of matter for use as a paint, comprising a coloring matter produced by forming a colloidal solution of a color pigment in a composition of matter having a base of alizarin oil and insoluble in water and a varnish comprising copal resin and fish-oil, and toluol.

8. A composition of matter for use as artists' coloring matter, comprising a coloring matter produced by forming a colloidal solution of a color pigment in a composition of matter having a base of alizarin oil and insoluble in water and a varnish containing copal resin, copaiva balsam, fish-oil, and a hereinbefore described liquid solvent of the aromatic series.

9. A composition of matter for use as artists' coloring matter, comprising a coloring matter produced by forming a colloidal solution of a color pigment in a composition of matter having a base of alizarin oil and insoluble in water and a varnish containing copal resin, copaiva balsam, fish-oil and toluol.

10. A composition of matter for use as artists' coloring matter, comprising a coloring matter produced by forming a colloidal solution of a color pigment in a composition of matter having a base of alizarin oil and insoluble in water and a varnish produced by boiling together copal resin, copaiva balsam and fish-oil, and a hereinbefore described liquid solvent of the aromatic series.

11. A composition of matter for use as artists' coloring matter, comprising a coloring matter produced by forming a colloidal solution of a color pigment in a composition of matter having a base of alizarin oil and insoluble in water and a varnish produced by boiling together copal resin, copaiva balsam and fish-oil, and toluol.

12. A composition of matter for use for printing purposes, comprising a coloring matter produced by forming a colloidal solution of a color pigment in a composition of matter having a base of alizarin oil and insoluble in water, large quantities of resins with which the said coloring matter is heated until a product is formed of a consistency to solidify on cooling, and a composition comprising a thick fluid resin mixture formed by heating together an animal fatty substance, resin, and a solvent for the resin.

In testimony whereof I have signed my name to this specification in the presence of two subscribing witnesses.

NICOLAI WASILIEVITCH TURKIN.

Witnesses:
CHRISTIAN ERFURT,
LYDIA RÖLL.